United States Patent [19]

Morey et al.

[11] Patent Number: 4,711,524
[45] Date of Patent: Dec. 8, 1987

[54] COMBUSTOR FIBERSCOPE

[75] Inventors: William W. Morey, West Hartford, Conn.; Elias Snitzer, Wellesley, Mass.

[73] Assignee: The United States of America as represented by the Secretary of the Navy, Washington, D.C.

[21] Appl. No.: 773,276

[22] Filed: Sep. 6, 1985

[51] Int. Cl.⁴ .................................................. G02B 6/06
[52] U.S. Cl. ................................ 350/96.25; 350/96.26
[58] Field of Search ............... 350/96.10, 96.23, 96.24, 350/96.25, 96.26

[56] References Cited

U.S. PATENT DOCUMENTS

| 3,064,128 | 11/1962 | Duke | 350/96.1 X |
| 3,417,745 | 12/1968 | Sheldon | 350/96.26 X |
| 4,377,086 | 3/1983 | Linder et al. | 350/96.1 X |
| 4,425,025 | 1/1984 | Sunaga | 350/96.26 |

Primary Examiner—John Lee
Assistant Examiner—John Ngo
Attorney, Agent, or Firm—Robert W. Adams

[57] ABSTRACT

A fiberscope for the viewing of the interior of an operating engine combustor is provided with a fused coherent fiber bundle as an image conduit to transmit the image of said interior through the wall of the combustor. Illumination may be provided through the use of a second optical fiber or bundle and a coherent light source aligned with the image conduit.

9 Claims, 5 Drawing Figures

COMBUSTOR FIBERSCOPE

BACKGROUND OF THE INVENTION

This invention relates generally to the analysis of heat distribution and flame characteristics within the combustor of an engine, and particularly to the means for acquiring data on such characteristics. More particularly, the invention relates to the retrieval of data by viewing the interior of an engine combustor while in operation. In even greater particularity, the invention relates to fiber optical means for remotely viewing the interior of an operating combustor.

Briefly, the present invention employs a rigid, fiber optic image conduit to transfer the image from the interior to the exterior of a combustor. A viewing lens forms the image of the combustor interior on the end of the conduit, and the image is transmitted to a long flexible coherent fiber optic bundle for transmission to a remote location for viewing or recording with optical instruments.

It is an object of the present invention to provide a more compact and rugged probe through the use of the fused fiber bundle, inasmuch as the fused fiber bundle is smaller than a flexible bundle and does not require lubrication to reduce fiber breakage. The small size is important to allow convenient access and not significantly perturb the combuster environment.

Another object of the invention is to provide a combustor fiberscope for use in higher temperature, inasmuch as the temperature limitation of the fused bundle extends the temperature range to the softening point of the glass therein.

Yet another object is to provide a less costly combustor fiberscope by utilizing a replaceable and relatively inexpensive image conduit.

These and other objects, features, and advantages will become more apparent from the study of the following description of a preferred embodiment in conjunction with the appended drawings.

DESCRIPTION OF A PREFERRED EMBODIMENT

Figure 1:
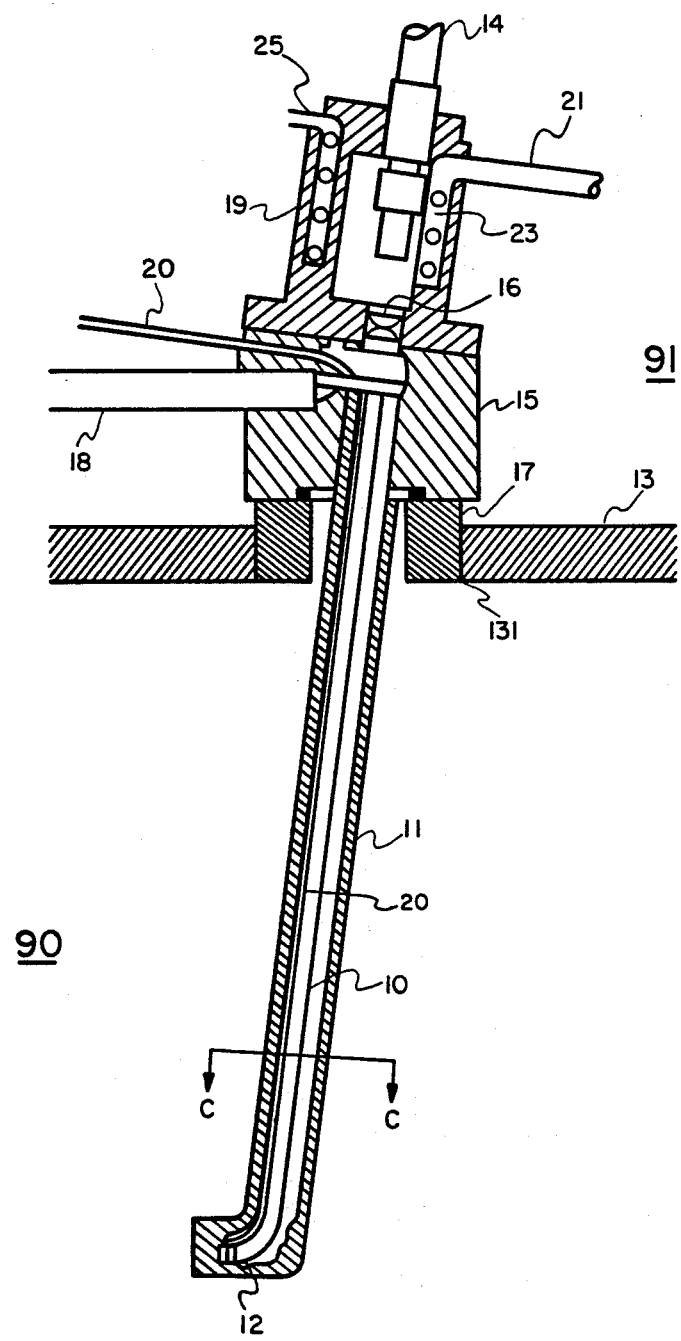
FIG. 1 is a cross-sectional view of the combustor viewing probe transverse the optical axis.
Figure 3:
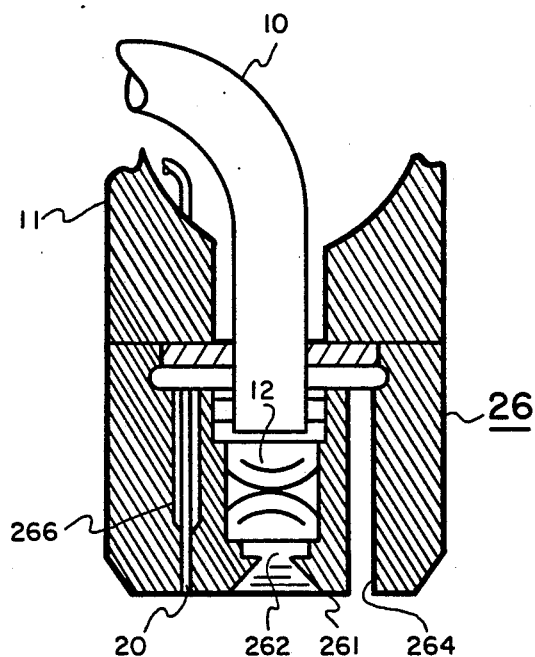
FIG. 3 is a cross-sectional view of the viewing lens assembly.

Referring to FIGS. 1 and 3, the combustor fiberscope uses a rigid, fiber optic image conduit 10 which is a coherent bundle of fibers fused together to transfer the image from the interior of the combustor 90 to the exterior thereof at 91. A viewing lens 12 forms the image of combustor interior 90 on the end of conduit 10, and the image is transmitted about 25 cm to a position just outside the combustor case 13. An image transfer lens or lens doublet 16 is placed proximal conduit 10 to transmit the image to a long, flexible fiber optic bundle 14 which in turn transmits the image for remote viewing or recording thereof.

Image conduit 10 is enclosed by a sheath 11 of durable material to afford some shielding from heat and radiation, as well as to provide support to said conduit 10. Conduit 10 and sleeve 11 pass through an aperture 131 in combustor case 13 and are held in position by fitting 15, which is mounted on boss 17 mated to combustor case 13. Transfer lens 16 is held in position by head 19 which is fixedly attached to fitting 15 and which also captures the proximal end of fiber optic bundle 14 such that the end thereof is held in operative relation to transfer lens 16 and conduit 10 for image transmission. Head 19 is water cooled, having a water ingress 21 and a water jacket 23 within its outer walls, and an outlet 25 connected thereto.

Sleeve 11 is spaced apart from conduit 10 such that cooling gas may be circulated therebetween. Gas inlet 18 is integrated into fitting 15 to provide the cooling gas to conduit 10 and sheath 11.

Figure 4:
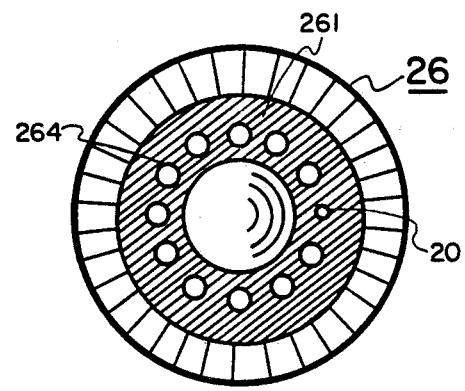
FIG. 4 is the end view of the viewing lens assembly.

At the end of sheath 11 is the viewing lens assembly 26, shown more clearly in FIGS. 3 and 4. Sleeve 11 and conduit 10 are formed to a preferential viewing angle, illustrated at near 90°, proximal viewing lens assembly 26. Assembly 26 holds viewing lens 12 in fixed relation to the end of conduit 10 such that the image of the interior 90 of the combustor is transmitted thereto. Viewing lens 12 as illustrated in this embodiment is a saphire doublet and is held internally to assembly 26. Assembly 26 has a viewing port 261 along the optical axis of viewing lens 12. Viewing port 261 communicates with cavity 262, proximal the surface of viewing lens 12, said cavity 262 being connected to the interior of sheath 11 by two channels 263 formed in assembly 26 but not shown in the illustration. Channels 263 are preferentially located symmetrically within assembly 26. Channels 263 serve to allow the cooling gas from the interior of sheath 11 to exit via viewing port 261, thereby passing over the surface of viewing lens 12 and providing some cooling thereto. Additionally, the pressurized cooling gas exiting through viewing port 261 acts as a gaseous buffer to deflect any debris or residue incident upon viewing port 261. There are additional apertures 264 located about the rim of assembly 26 which also provide egress for the pressurized gas from the interior of sheath 11.

Figure 2:
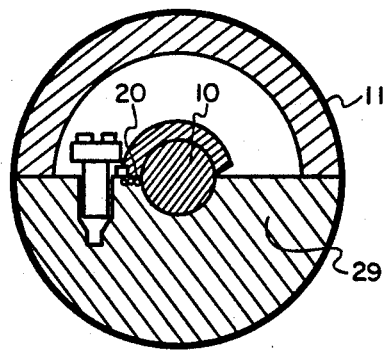
FIG. 2 is a cross-sectional view of the combustor viewing probe along the optical axis at C—C.

At times it may be advantageous to illuminate the interior 90 of the combustor while viewing through the fiberscope. This is accomplished by the use of an additional, or a plurality of additional, optical illumination fibers 20 through which a light source, such as a laser, may be directed. Optical fiber 20 enters the cavity between sheath 11 and conduit 10 via fitting 15 and parallel the course of conduit 10 to the viewing lens assembly 26. In FIG. 2 may be seen the periodic support given to conduit 10 and illuminating fiber 20 by one of several flanges 29 spaced along the length of sheath 11, which prevent unnecessary mechanical stress being placed on either optical connector. Illuminating fiber 20 passes through an aperture 266 such that fiber 20 is held in a fixed relation to viewing port 261 and thus viewing lens 12. If diffuse lighting is desired, the end face of fiber 20 may be roughly finished, or if a narrow beam of light is desired, the end face of said fiber 20 may be smoothly polished.

Figure 5:
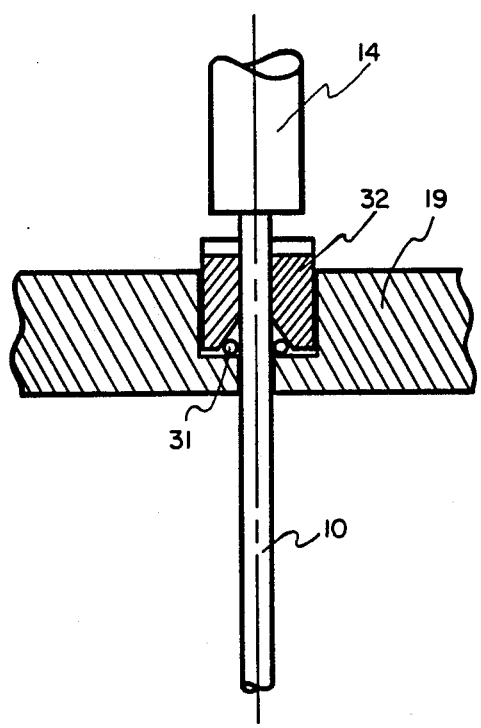
FIG. 5 is a view of the coupling "O" ring.

The optical coupling between conduit 10 and optical fiber bundle 14 may be accomplished by either a transfer lens 16 as shown in FIG. 1, or by proximity or butt coupling, as shown in FIG. 5. The use of transfer lens 16 is restricted in that in order to obtain satisfactory resolution and avoid distortion, a small numerical aperture is required, e.g., an f/16 stop may be required; unless a multi-element, high quality lens is used to effectuate a minimally distorted transfer of the ten micron image elements. Because of the expense entailed in producing fiberscopes to the exacting standards required for the transfer lens alternative, butt coupling is preferred. To avoid abrasion of butt coupled conduit 10 and fiber bundle 14, a special optical coupling grease or a very thin (1 mil) and clear plastic sheet may be placed at the interface.

Pressure seals are made at the junction of boss 17 and probe mounting fitting 15 with a high temperature gasket or O-ring. Gasket or O-ring pressure seals are also required at the interface of head 19 and fitting 15 and at transfer lens 16. For butt coupling of conduit 10 to fiber bundle 14, the required pressure seal is accomplished through the use of O-ring 31 placed around conduit 10 as shown in FIG. 5. O-ring 31 has a special nut 32 which tightens the O-ring about conduit 10. The size of conduit 10, i.e., the cross-sectional area, is smaller than fiber bundle 14, thus a smaller probe can be made, and since the fibers comprising 10 are fused together rather than glued with epoxy, the conduit is not flexible nor subject to as many individual fiber breakages. However, the variation in diameter must be considered when coupling the conduit 10 to the fiber bundle 14.

Because of the epoxy bonding of the flexible fiber optic cables, the maximum operational temperature range is restricted. Inasmuch as conduit 10 is made of fused fibers, its temperature range is limited by the higher temperature required to reach the softening point of the glass used in the fiber construction. It will be appreciated that even with the enhanced temperature range, the fused conduit may still be damaged by excessive temperature, impact within the combustor, or mishandling. However, should the conduit become unusable, it can be replaced at a cost on the order of $15 to $20, whereas replacing an entire fiber bundle could cost several thousand dollars.

It can be seen therefore that what has been described is a new and efficient fiberscope for viewing the interior of an operational combustor such as a jet engine, and while the invention has been described by means of illustration drawn to a particular embodiment, it is to be understood that the invention is not limited by said illustration, but rather is deemed to include such modifications, alterations, changes and equivalences as may be encompassed within the scope and spirit of the appended claims.

What is claimed is:

1. An apparatus for providing an interior view of a gas turbine combustor during the operation thereof, said apparatus giving access thereto via an aperture in the wall of said combustor, comprising in combination:
   a rigid image conduit composed of fused coherent optical fibers extending through said combustor wall aperture, thus having an interior and exterior end;
   a viewing lens operably positioned to form an image of said combustor interior on said interior end of said image conduit;
   a flexible coherent optical fiber bundle having one end located proximal the exterior end of said image conduit and the other end located distal therefrom;
   means for optically coupling said image conduit to said optical fiber bundle;
   means for housing said image conduit within said combustor also forming a seal with said combustor wall about said image conduit at said aperture;
   means for cooling said image conduit and said viewing lens operably integrated into said housing means; and
   means for illuminating said combustor interior co-aligned with said image conduit within said housing means.

2. The apparatus of claim 1, wherein said optical coupling means comprises transfer lenses located between said image conduit and said fiber optic bundle.

3. The apparatus of claim 1, wherein said optical coupling means comprises:
   optical coupling material applied to the interface of said image conduit and said fiber optic bundle; and
   means for holding said image conduit and fiber optic bundle in an end-to-end abutting relationship.

4. The apparatus of claim 1, wherein said housing means comprises:
   an elongated cylindrical sleeve about said rigid image conduit, extending therewith through said aperture, providing support to and shielding said image conduit and said viewing lens;
   an upper portion holding said cylindrical sleeve and forming a seal therewith between said cylindrical sleeve and said combustor wall at said aperture.

5. An apparatus according to claim 1, wherein said means for cooling comprises:
   a source of cooling gas held at a temperature below that of said combustor;
   means for introducing said cooling gas into said housing means; and
   means for passing a portion of said cooling gas over the surface of said viewing lens for cooling thereof.

6. An apparatus according to claim 5, wherein said means for passing a portion of said gas over the surface of said viewing lens comprises a viewing lens assembly attached to said housing, having a central cavity wherein said viewing lens is mounted in cooperative relation to the end of said conduit, having therethrough a plurality of apertures located about said viewing lens and providing egress for said cooling gas, said assembly forming at least one channel to direct cooling gas to said lens surface for cooling said lens and purging soot ladened combustor gases from exposed lens viewing surfaces.

7. The apparatus of claim 1, wherein said illuminating means comprises independent fiber optic means for conveying laser light from the exterior of said combustor to the interior of said combustor, said fiber optic means contained within said housing parallel to said conduit and positioned such that the light transmitted thereby illuminates an area within the field of view of said viewing lens.

8. The apparatus of claim 7, wherein said independent fiber optic means has a roughened face such that light emitted therefrom is diffused over the field of view.

9. The apparatus according to claim 1, further comprising a head for cooling said optical coupling means and said flexible optical fiber bundle, said head having as components as inner and outer shell forming a water jacket, and inlet and outlet means for the introduction and removal of cooling water therefrom, said head cooperatively mounted in relation to said housing means to hold said flexible optical fiber bundle in a fixed relation to said conduit.

* * * * *